US00RE42262E

(19) United States
(12) Reissued Patent
Stephens, Jr.

(10) Patent Number: US RE42,262 E
(45) Date of Reissued Patent: Mar. 29, 2011

(54) METHOD AND APPARATUS FOR REPRESENTING AND NAVIGATING SEARCH RESULTS

(75) Inventor: James J. Stephens, Jr., Austin, TX (US)

(73) Assignee: Frederick Monocacy LLC, Los Alto, CA (US)

(21) Appl. No.: 11/256,615

(22) Filed: Oct. 21, 2005

Related U.S. Patent Documents

Reissue of:
(64) Patent No.: 6,636,853
Issued: Oct. 21, 2003
Appl. No.: 09/385,149
Filed: Aug. 30, 1999

(51) Int. Cl.
*G06F 17/30* (2006.01)

(52) U.S. Cl. ..... 707/10; 707/102; 709/203
(58) Field of Classification Search ..... 707/2–5, 707/100, 102, 7, 10; 715/738, 744; 345/619, 345/645, 646; 709/203; 346/619, 645, 646
See application file for complete search history.

(56) References Cited

U.S. PATENT DOCUMENTS

| | | | | | |
|---|---|---|---|---|---|
| 5,530,852 | A | * | 6/1996 | Meske, Jr. et al. | 709/206 |
| 5,649,186 | A | * | 7/1997 | Ferguson | 707/10 |
| 5,722,418 | A | * | 3/1998 | Bro | 600/545 |
| 5,761,662 | A | * | 6/1998 | Dasan | 707/10 |
| 5,784,608 | A | * | 7/1998 | Meske, Jr. et al. | 707/2 |
| 5,857,179 | A | | 1/1999 | Vaithyanathan et al. | |
| 5,991,756 | A | * | 11/1999 | Wu | 707/3 |
| 6,023,701 | A | * | 2/2000 | Malik et al. | 707/10 |
| 6,070,157 | A | | 5/2000 | Jacobson et al. | |
| 6,141,007 | A | * | 10/2000 | Lebling et al. | 715/792 |
| 6,185,553 | B1 | * | 2/2001 | Byrd et al. | 707/3 |
| 6,189,019 | B1 | * | 2/2001 | Blumer et al. | 715/513 |
| 6,199,099 | B1 | * | 3/2001 | Gershman et al. | 709/203 |
| 6,202,058 | B1 | * | 3/2001 | Rose et al. | 706/45 |
| 6,243,713 | B1 | * | 6/2001 | Nelson et al. | 707/104.1 |
| 6,275,829 | B1 | * | 8/2001 | Angiulo et al. | 707/104.1 |
| 6,289,350 | B1 | * | 9/2001 | Shapiro et al. | 707/100 |
| 6,327,574 | B1 | | 12/2001 | Kramer et al. | |
| 6,370,535 | B1 | | 4/2002 | Shapiro et al. | |
| 6,385,602 | B1 | | 5/2002 | Tso et al. | |
| 6,393,469 | B1 | * | 5/2002 | Dozier et al. | 709/219 |
| 6,999,959 | B1 | | 2/2006 | Lawrence et al. | |

FOREIGN PATENT DOCUMENTS

| | | |
|---|---|---|
| JP | 09231238 | 9/1997 |
| JP | 10143517 | 5/1998 |
| JP | 11213008 | 8/1999 |
| WO | 9710537 | 3/1997 |
| WO | 9738378 | 10/1997 |

OTHER PUBLICATIONS

Zamir et al., "Web Document Clustering: A Feasibility Demonstration", ACM 1998.
Hirtle et al., "Clusters on the World Wide Web: creating neighborhoods of make–believe", ACM 1998.
Mukherjea et al., "Using Clustering and Visualization for Refining the Results of a WWW Image Search Enginge", ACM 1998.

(Continued)

*Primary Examiner*—Cheryl Lewis

(57) ABSTRACT

A method and apparatus for representing and navigating search results from a database on a computer system. A graphical user interface is generated to receive user input including a data source to search for information and a query indicating information which is desired from the data source. The user input is transmitted to the data source, the search is performed and information responsive to the query resulting from the search is received from the data source. The search results include characteristics of the responsive information. The responsive information is clustered into a plurality groups based on selected characteristic information and the user may select at least one group of the responsive information to be displayed.

85 Claims, 11 Drawing Sheets

OTHER PUBLICATIONS

Sebrechts et al., "Visualization of Search Results: a comparative evaluation of text, 2D, and 3D interfaces", ACM Aug. 1999.

Roussinov et al., "Interactive Internet Search through Automatic Clustering: An Empirical Study", ACM Aug. 1999.

Nowell et al., "Visualizing Search Results: Some Alternatives to Query–Document Similarity", ACM 1996.

Terveen et al., "Constructing, Organizing, and Visualizing Collections of Topically related Web resources", AMC Mar. 1999.

Related U.S. Appl. No. 11/512,838, filed Aug. 30, 2003; Method and apparatus for representing and navigating search results.

* cited by examiner

200

1. IBM Products

IBM Products: a listing of various IBM products. We make over 40,000 products using the world's most advanced information technologies -- see what we can deliver for you.
http://www.ibm.com/

2. Java - Speech for Java from IBM Research has been Updated

Speech for Java from IBM Research has been Updated. This update implements the newly released version 1.0 of the Java Speech API. Speech for Java is a Java programming interface for incorporating IBM's ViaVoice speech technology into user interfaces.
http://204.146.18.33/

3. Lots of Improvements for Speech for Java 206 202

Lots of improvements for Speech for Java. A Java programming interface for incorporating IBM's ViaVoice speech technology into user interfaces. March 23. New improvements in runtime resource, audio error reporting, event delivery for Swing.
http://content15c.advantis.com/ 204

4. IBM ViaVoice software information map

IBM ViaVoice software information map Welcome to the IBM ViaVoice software information map for solution developers. This map provides quick and easy access to information on the IBM ViaVoice suite of products. Product information IBM ViaVoice.
http://www.developer.ibm.com/

5. javaspeech-interest: [javaspeech] ViaVoice & JSAPI

[javaspeech] ViaVoice & JSAPI John Amenta (jamenta@martha.umevoice.com) Fri, 20 Nov 1988 07:24:01 -0800 Messages sorted by: [ date ][ thread ][ subject ][ author ] Next message: Justin Starren: "Re [javaspeech] ViaVoice & JSAPI" Previous message.
http://ftp.java.sun.com/

6. JavAus "Programming with the Java Media APIs", 22 February 1999

Availability of Java Media APIs Public information from Sun as of 21 January 1999: Java Media API API Type API Specification (version) FAQ Reference implementation (version) Mailing List Java 2D Core 2 Yes (1.0) Yes Yes (in Java 2/JDK 1.2) Yes Java
http://www.billday.com/

7. Download the New Release of Speech for Java

Download the New Release of Speech for Java Speech for Java has a new maintenance level release. February 19. Speech for Java is a Java programming interface for incorporation IBM's ViaVoice speech technology into user interfaces. Speech for Java.
http://content01c.advantis.com/

More Results

FIG. 2
(PRIOR ART)

METHOD AND APPARATUS FOR REPRESENTING AND NAVIGATING SEARCH RESULTS

Matter enclosed in heavy brackets [ ] appears in the original patent but forms no part of this reissue specification; matter printed in italics indicates the additions made by reissue.

*More than one reissue application has been filed for the reissue of U.S. Pat. No. 6,636,853. The present application, U.S. application Ser. No. 11/256,615, is a reissue application of U.S. application Ser. No. 09/385,149 filed Aug. 30, 1999, now U.S. Pat. No. 6,636,853. U.S. application Ser. No. 11/513,838, filed Aug. 30, 2006, is a continuation of the present reissue application, U.S. application Ser. No. 11/256,615.*

BACKGROUND OF THE INVENTION

1. Field of the Invention

This invention relates generally to graphical user interfaces (GUIs). More specifically, this invention relates to an apparatus and method for graphically displaying results of a search conducted on an information network such as the Internet, local and remote databases of content providers, etc.

2. Description of the Related Art

A significant development in computer networking is the Internet, which is a sophisticated worldwide network of computer systems. A user that wishes to access the Internet typically does so using a software program known as a web browser that is hosted on a personal computer or other data processing device that is capable of executing the web browser program and being connected to the Internet. A web browser uses a standardized interface protocol, such as HyperText Transfer Protocol (HTTP), to make a connection via the Internet to other computers known as web servers, to receive user commands to operate certain browser functions and/or to request information from the Internet, and to receive information from the web servers that is presented to the user, typically on a display device such as a monitor.

An ever-increasing amount of information is available on the Internet and other information databases (collectively referred to as information networks). A query to an information network requires a textual specification based on keywords and logical operators between keywords. In most instances, the query returns only the results, which may not be very useful when the number of results returned is much larger than that which can be viewed and manipulated on a screen.

When performing a search, it is typical that a search strategy will be used in order to find the desired information. Most search strategies are premised on attaining a reasonable number of items that satisfy a search criteria. Typically, a query is comprised of keywords (i.e., search terms) connected together via logical and/or proximity operators. Logical operators are used to include or exclude items in a set whereas proximity operators are used to identify items having keywords that are a predetermined distance apart, such as within 10 words, in the same sentence, or that are adjacent. Once a query is made and executed, a list of items satisfying the criteria of the query is presented to the user. The user can then either view one or more items in the list, or if the list is large, modify the search to reduce the number of items in the list.

Data navigation is the process of viewing different dimensions, slices, and levels of detail of a multidimensional database. In a typical list of search results from an information network, documents or other items are listed in descending order based on a relevancy value. The relevancy value for each document is based the number of times the keywords are found in the document. A user must still sort through the list sequentially to view other characteristics of the documents, such as size and date, which may also help determine a document's relevancy. Thus it is desirable to provide a data navigation tool which allows the user to view, sort, and navigate search results according to several different data and relevant characteristics.

One technique for sorting lists is known as data clustering, which is the process of dividing a data set into mutually exclusive groups such that the members of each group are as "close" as possible to one another, and different groups are as "far" as possible from one another, where distance is measured with respect to all available variables. There are several models for data clustering, e.g., K-means clustering, self-organizing feature maps, the neural gas algorithm, and complexity optimized vector quantization.

In the K-means procedure, for example, suppose a set of feature vectors $x_1, x_2, \ldots, x_n$ are from the same class or subset, and that they fall into k compact clusters, k<n. Let m; be the mean of the vectors in cluster i. If the clusters are well separated, a minimum-distance classifier can be used to separate them. That is, s is in cluster i if $\|x-m_i\|$ is the minimum of all the k distances. Thus, the k-means procedure partitions the n examples into k clusters so as to minimize the sum of the squared distances to the cluster centers. The results depend on the value of k, which can be any value from 2 to n. When k=n, the procedure is known as the nearest neighbor classifier.

SUMMARY OF THE INVENTION

A method and apparatus for representing and navigating search results from a database on a computer system. A graphical user interface is generated to receive user input including a data source to search for information, and a query indicating information which is desired from the data source. The user input is transmitted to the data source, the search is performed and information responsive to the query resulting from the search is received from the data source. The search results include characteristics of the responsive information. The responsive information is clustered into a plurality of groups based on selected characteristic information and means are provided to allow the user to select at least one group of the responsive information to be displayed.

The responsive information includes a list of documents containing information related to the query. The graphical user interface includes a first display portion showing the plurality of groups of characteristic information available for the user to select, and a second display portion showing the list of documents in the responsive information.

In one embodiment, when the user selects one or more groups, the documents displayed in the second display portion belong to the group(s) selected by the user. When a group is selected, it is separated into a plurality of subgroups based on the range of the characteristic information for the selected group. The first display portion is updated to show the plurality of subgroups.

In another embodiment, each group is separated into a plurality of subgroups based on the range of the characteristic information for each group. The first display portion shows the plurality of subgroups, which may be color coded to differentiate the subgroups. Similarly, the list of documents in the second display portion may be correspondingly color coded to the color code in the first display portion.

In another embodiment, a server may be used to transmit data between the client computer system and the data source. In this configuration the server includes program instructions for separating the documents into the plurality of groups based on selected characteristic information.

In another embodiment of the present invention, additional information may be displayed based on the group of responsive information selected by the user.

In another embodiment of the present invention, the first display portion includes a stratum showing the subgroups of the documents. When the user selects one or more subgroups, another stratum showing the subgroup of the responsive information is displayed. The responsive information in the second display portion is based on the subgroup selected by the user.

Another feature of the present invention allows the user to select a document to be displayed for the user to examine its contents.

Another feature of the present invention allows the user to re-arrange the order in which the list of documents in the second display portion are displayed.

The foregoing has outlined rather broadly the objects, features, and technical advantages of the present invention so that the detailed description of the invention that follows may be better understood.

BRIEF DESCRIPTION OF THE DRAWINGS

FIG. 2 is an example of prior art search results output by an Internet search engine and displayed by a browser program.

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The method and apparatus of the present invention is applicable to devices that access a computerized information network. A number of different information networks are available that allow access to information contained on their computers, with the Internet being one that is generally known to the public. While the Internet is used herein as an example of how the present invention is utilized, it is important to recognize that the present invention is also applicable to other information networks and information systems including Intranets, database management systems, and document retrieval systems. For those who are not familiar with the Internet, the world-wide web, web servers, and web browsers, a brief overview of these concepts is presented here.

Figure 1:
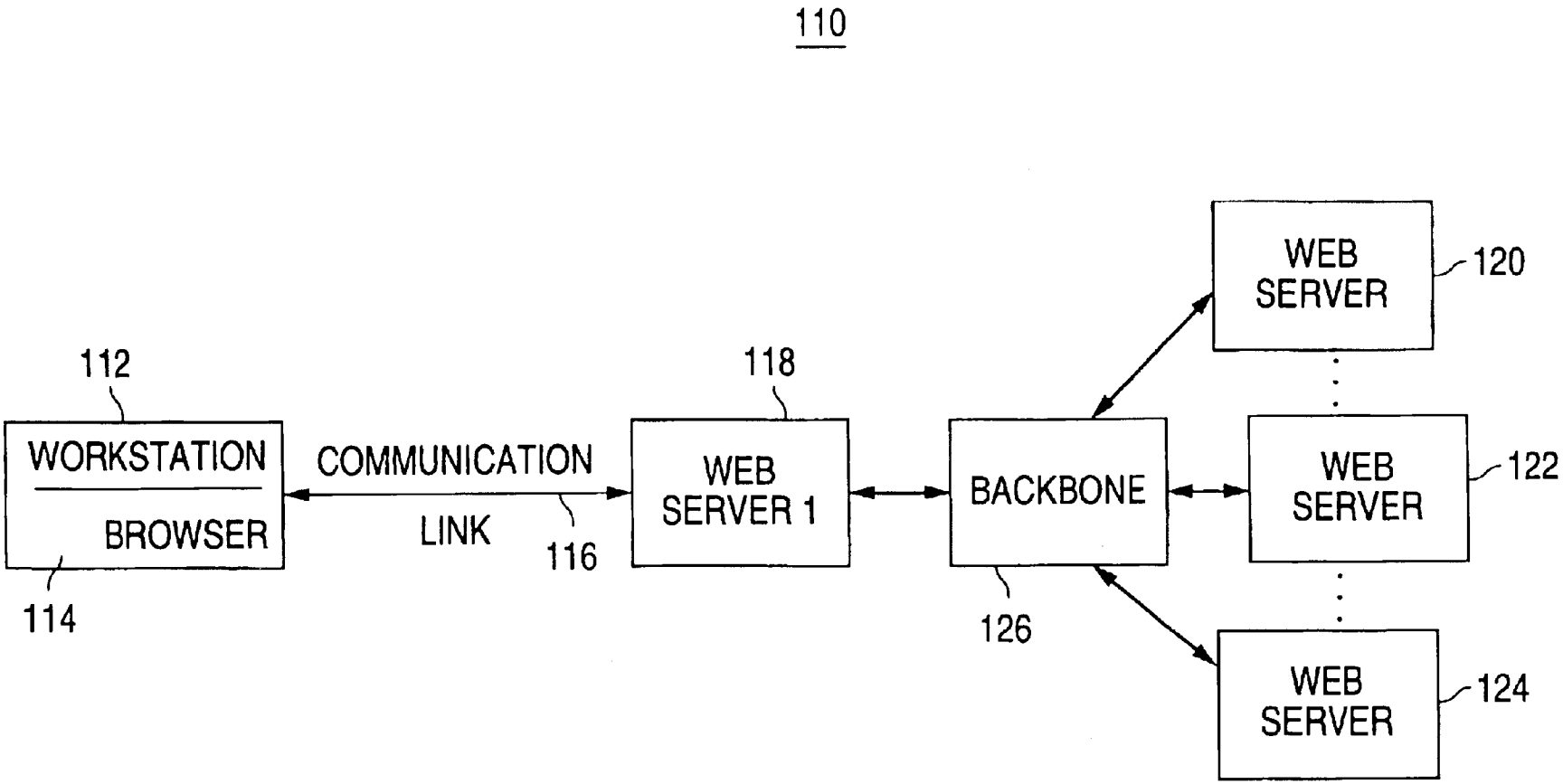
FIG. 1 (PRIOR ART)
FIG. 1 is a block diagram of a system for accessing an information network found in the prior art.

An example of a typical Internet connection found in the prior art is shown in FIG. 1. A user that wishes to access information on the Internet typically has a computer workstation 112 that executes an application program known as a web browser 114. Workstation 112 establishes a communication link 116 with web server 118 such as a dial-up wired connection with a modem, a direct link such as a T1 or ISDN line, a wireless connection through a cellular or satellite network, or a local data transport system such as Ethernet or token ring over a local area network. When the user enters a request for information by entering commands in web browser 114, workstation 112 sends a request for information, such as a search for documents pertaining to a specified topic, or a specific web page to web server 118. Each web server 118, 120, 122, 124 on the Internet has a known address which the user must supply to the web browser 114 in order to connect to the appropriate web server 118, 120, 122, or 124. If the information is available on the user's web server 118, a central link such as backbone 126 allows web servers 118, 120, 122, 124 to communicate with one another to supply the requested information. Because web servers 118, 120, 122, 124 can contain more than one web page, the user will also specify in the address which particular web page he wants to view. The address, also known as a universal resource locator (URL), of a home page on a server is a series of numbers that indicate the server and the location of the page on the server, analogous to a post office address. For simplicity, a domain name system was developed that allows users to specify servers and documents using names instead of numbers. The format of domain names on the world wide web is www.xxx.yyy, where www stands for world wide web, xxx is the name of the provider of the content on the page(s), and yyy is the domain of the server. There are several different domains in the world wide web that pertain to different types of organizations such as educational institutions (.edu), government (.gov), commercial businesses (.com), and non-profit organizations (.org). A URL may further specify a particular page in a group of pages belonging to a content provider by including additional information at the end of a domain name.

The web servers 118, 120, 122, 124 execute a web server application program which monitors requests, services requests for the information on that particular web server, and transmits the information to the user's workstation 112. A web page is primarily visual data that is intended to be displayed on the display monitor of the user's workstation 112. When web server 118 receives a web page request, it will transmit a document, generally written in a markup language such as hypertext markup language (HTML), across communication link 116 to the requesting web browser 114. When web server 118 receives a search request, the request is sent to the server containing the search engine specified by the user. The search engine then compiles one or more pages containing a list of links to web pages on other web browsers 120, 122, 124 that may contain information relevant to the user's request. The search engine transmits the page(s) in markup language back to the requesting web server. Web browser 114 interprets the markup language and outputs the web page to the monitor of user workstation 112. This web page displayed on the user's display may contain text, graphics, and links (which are addresses of other web pages.) These other web pages (i.e., those represented by links) may be on the same or on different web servers 116. The user can go to these other web pages by clicking on the links using a mouse or other pointing device. This entire system of web pages with links to other web pages on other servers across the world comprises the world wide web.

Figure 1A:
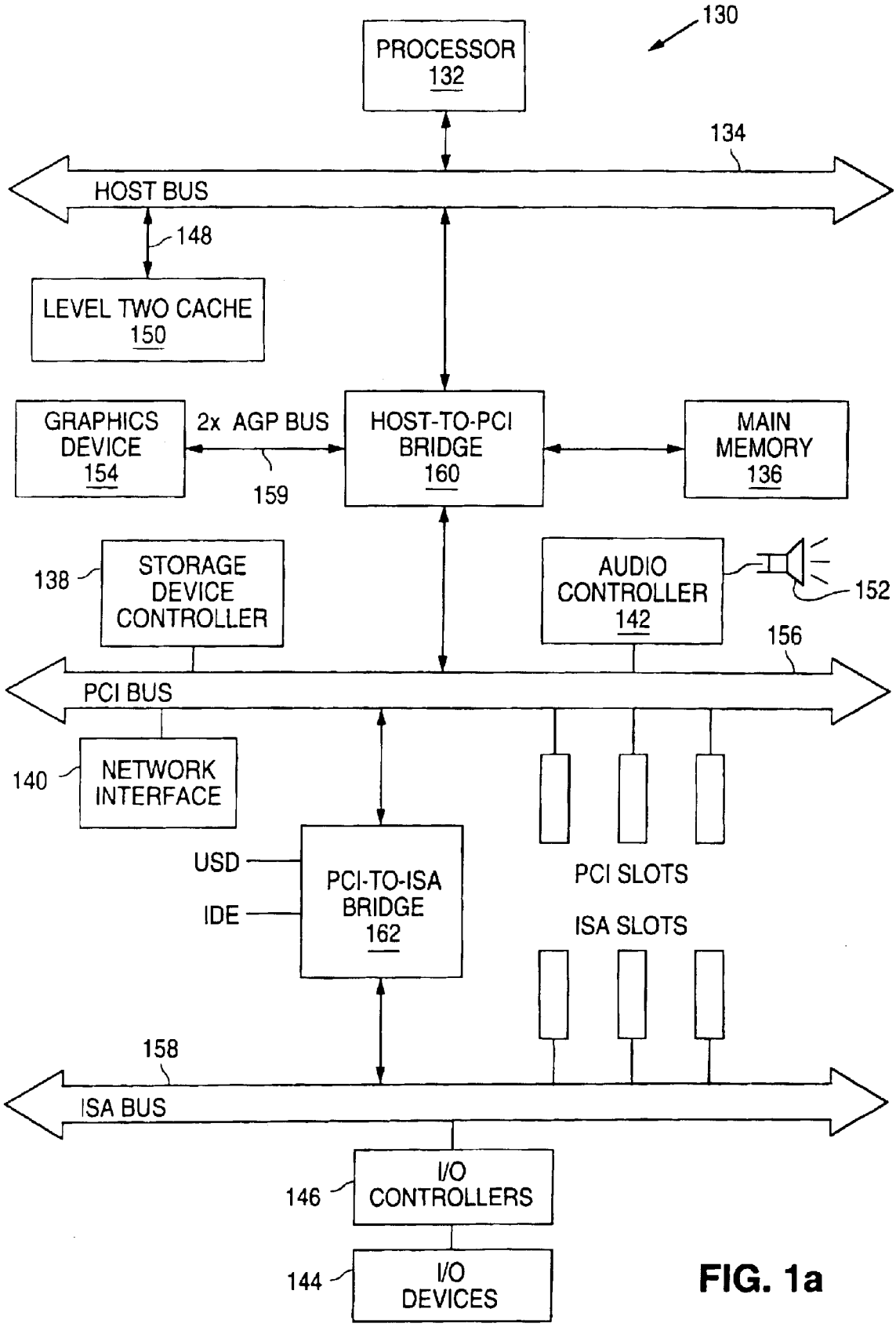
FIG. 1a is a diagram of components found in a typical computer system.

Workstation 112 and/or web servers 116 are computer systems, such as computer system 130 as shown in FIG. 1a. Computer system 130 includes central processing unit (CPU) 132 connected by host bus 134 to various components including main memory 136, storage device controller 138, network interface 140, audio and video controllers 142, and input/output devices 144 connected via input/output (I/O) controllers 146. Those skilled in the art will appreciate that this system encompasses all types of computer systems including, for example, mainframes, minicomputers, workstations, servers, personal computers, Internet terminals, network appliances, notebooks, palm tops, personal digital assistants, and embedded systems. Typically computer system 130 also includes cache memory 150 to facilitate quicker access between processor 132 and main memory 136. I/O peripheral devices often include speaker systems 152, graphics devices 154, and other I/O devices 144 such as display monitors, keyboards, mouse-type input devices, floppy and hard disk drives, DVD drives, CD-ROM drives, and printers. Many computer systems also include network capability, terminal devices, modems, televisions, sound devices, voice recognition devices, electronic pen devices, and mass storage devices such as tape drives. The number of devices available to add to personal computer systems continues to grow, however computer system 130 may include fewer components than shown in FIG. 1a and described herein.

The peripheral devices usually communicate with processor 132 over one or more buses 134, 156, 158, with the buses communicating with each other through the use of one or more bridges 160, 162. Computer system 130 may be one of many workstations or servers connected to a network such as a local area network (LAN), a wide area network (WAN), or a global information network such as the Internet through network interface 140.

CPU 132 can be constructed from one or more microprocessors and/or integrated circuits. Main memory 136 stores programs and data that CPU 132 may access. When computer system 130 starts up, an operating system program is loaded into main memory 136. The operating system manages the resources of computer system 130, such as CPU 132, audio controller 142, storage device controller 138, network interface 140, I/O controllers 146, and host bus 134. The operating system reads one or more configuration files to determine the hardware and software resources connected to computer system 130.

During operation, main memory 136 includes the operating system, configuration file, and one or more application programs with related program data. Application programs can run with program data as input, and output their results as program data in main memory 136 or to one or more mass storage devices through a memory controller (not shown) and storage device controller 138. CPU 132 executes many application programs, including one or more programs to establish a connection to a computer network through network interface 140. The application programs may be embodied in one executable module or may be a collection of routines that are executed as required.

Storage device controller 138 allows computer system 130 to retrieve and store data from mass storage devices such as magnetic disks (hard disks, diskettes), and optical disks (DVD and CD-ROM). The mass storage devices are commonly known as Direct Access Storage Devices (DASD), and act as a permanent store of information. The information from the DASD can be in many forms including application programs and program data. Data retrieved through storage device controller 138 is usually placed in main memory 136 where CPU 132 can process it.

One skilled in the art will recognize that the foregoing components and devices are used as examples for sake of conceptual clarity and that various configuration modifications are common. For example, audio controller 142 is connected to PCI bus 156 in FIG. 1a, but may be connected to the ISA bus 138 or reside on the motherboard (not shown) in alternative embodiments. As further example, although computer system 130 is shown to contain only a single main CPU 132 and a single system bus 134, those skilled in the art will appreciate that the present invention may be practiced using a computer system that has multiple CPUs 132 and/or multiple busses 134. In addition, the interfaces that are used in the preferred embodiment may include separate, fully programmed microprocessors that are used to off-load computationally intensive processing from CPU 132, or may include input/output (I/O) adapters to perform similar functions. Further, PCI bus 156 is used as an exemplar of any input-output devices attached to any I/O bus; AGP bus 159 is used as an exemplar of any graphics bus; graphics device 154 is used as an exemplar of any graphics controller; and host-to-PCI bridge 160 and PCI-to-ISA bridge 162 are used as exemplars of any type of bridge. Consequently, as used herein the specific exemplars set forth in FIG. 1 are intended to be representative of their more general classes. In general, use of any specific exemplar herein is also intended to be representative of its class and the non-inclusion of such specific devices in the foregoing list should not be taken as indicating that limitation is desired.

FIG. 2 shows an example of Internet search results 200 as presented in the prior art. The search query "Java viavoice" was used for purposes of illustration only and is not meant to limit use of the present invention in any way. The documents are listed in descending order based on their rank as determined by the search engine according to various criteria, such as the number of time the keywords or phrases appeared in the data record. The criteria for ranking the data records with respect to one another is typically unknown to the user. The results 200 provide a brief summary of each data record's contents, such as summary 202, and a hypertext link, such as link 204, which the user may select to retrieve data record 206. Depending on the search query, the resulting list may contain a very large number of data records, making it prohibitive for the user to review the entire list of the responsive information to determine which may be the most relevant for their purpose. The search results 200 often do not provide any characteristic information which could be useful in determining the relevancy of the documents to the user. Even when characteristic information, such as date or size of the documents, is available, the browser and other user interfaces to search results do not provide means for the user to navigate through the documents based on characteristic information.

Figure 3:
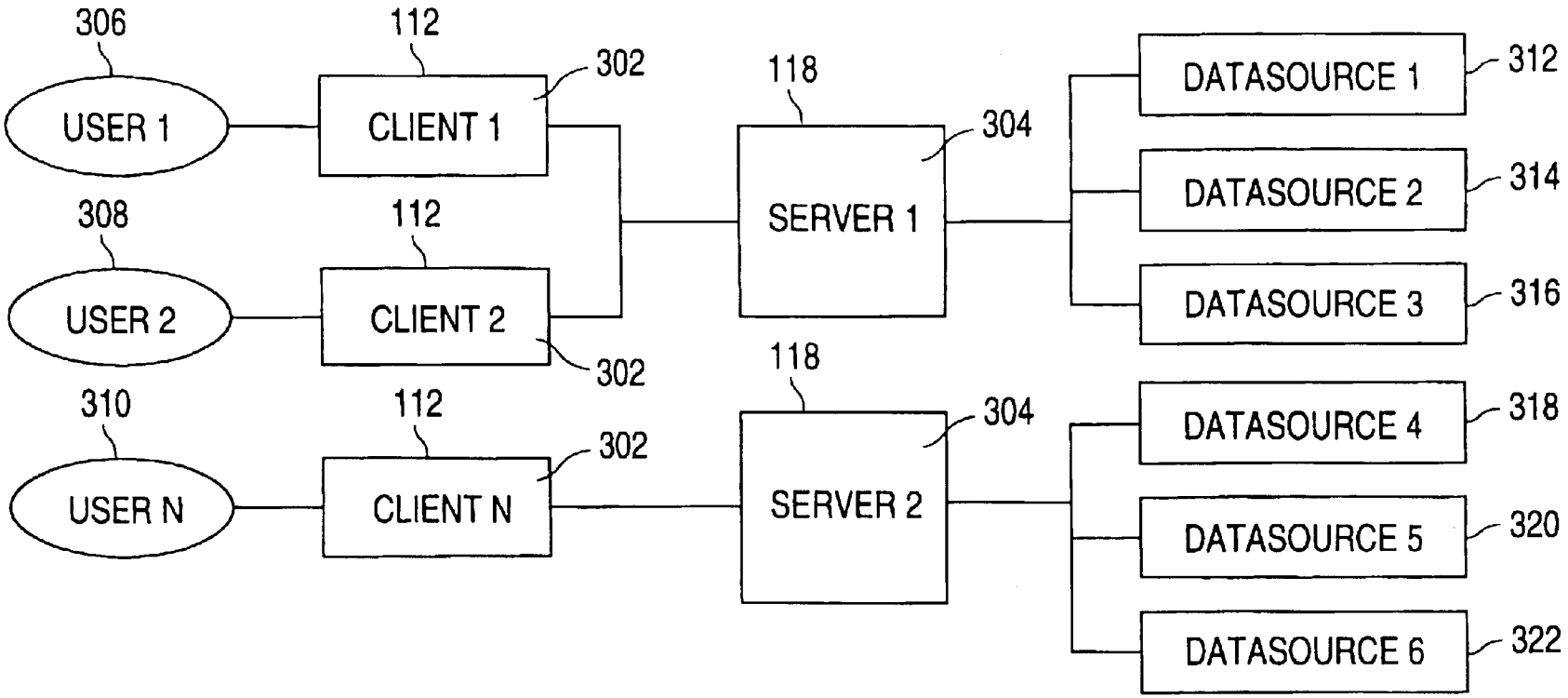
FIG. 3 is a block diagram of one embodiment of an architecture for program instructions for viewing and navigating search results in accordance with the present invention.

The present invention is designed to provide the user with more information regarding the results of a search and to allow the user to navigate through the information to facilitate finding the most relevant documents. In one embodiment shown in FIG. 3, the present invention includes client program instructions 302 that are executed on workstation 112 and server program instructions 304 that are executed on servers 118. Client program instructions 302 may be implemented as a standalone executable program, or they may be included as an extension to web browser 114, such as a Java applet that is executed through an application programmer's interface (API) in web browser 114. Users 306, 308, 310 interact with different copies of client program instructions 302 via I/O devices 144 connected to workstations 112. Server program instructions 304 can access one or more data sources 312 through 322 for information that is responsive to the user's query. Server program instructions 304 on servers 118 can service multiple clients concurrently. Data sources 312 through 322 include program instructions that interface with one or more search engines that retrieve information responsive to the user's query from computer systems associated with data sources 312 through 322. Alternatively, client program instructions 302 may communicate directly with one or more data sources 312 through 322. In this situation, either client program instructions 302, or program instructions for transmitting the information from data sources 312 through 322, are capable of parsing the responsive and formatting it for use by client program instructions 302.

Figure 4:
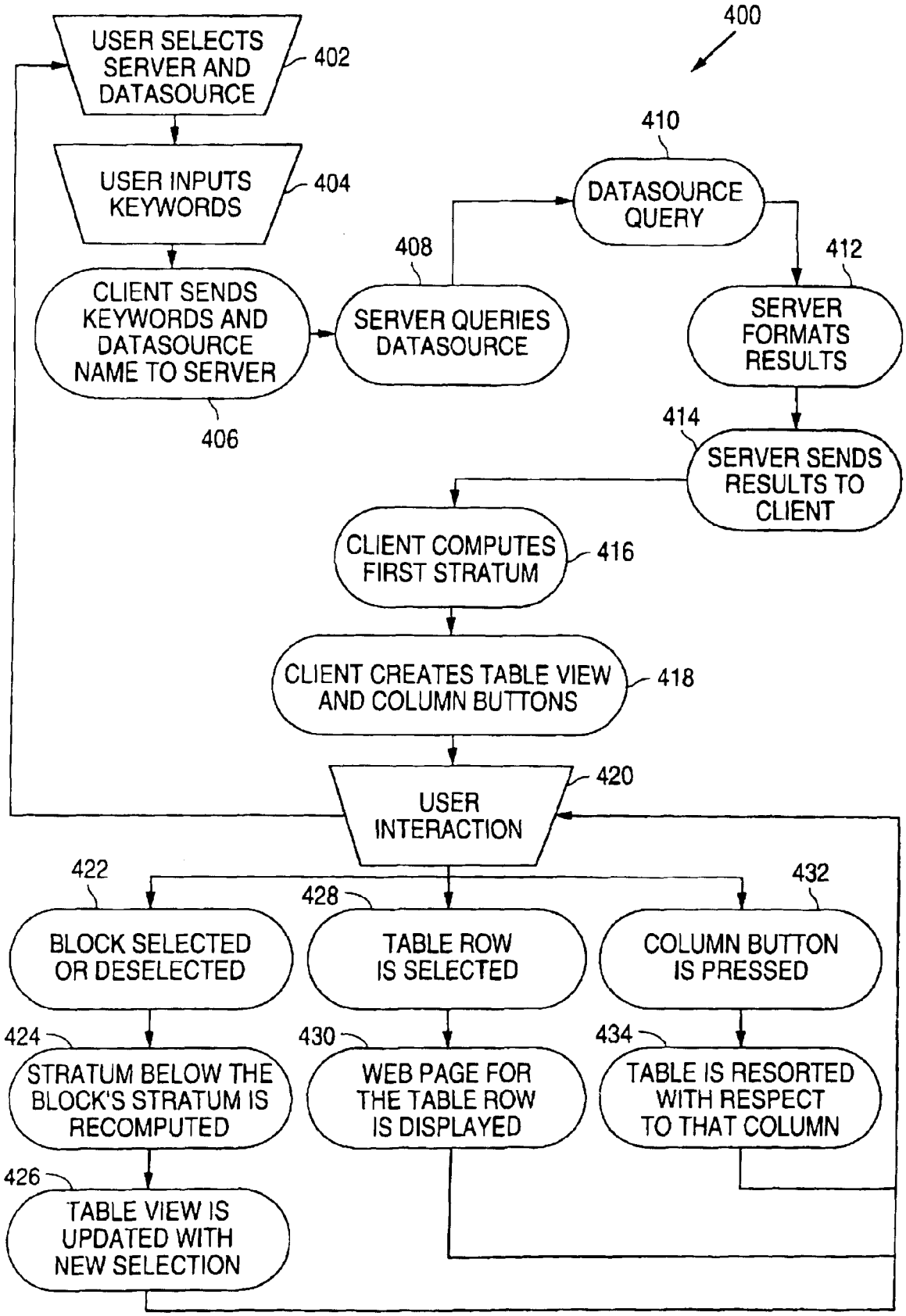
FIG. 4 is a flowchart for program instructions for viewing and navigating search results in accordance with the present invention.

FIG. 4 shows a flowchart of one embodiment the present invention including the functionality of client program instructions 302 and server program instructions 304, and their interaction with one another and the user. In blocks 402 and 404, the user first selects a server and a data source by selecting or providing a name of a data source to be used, and then inputs keywords and/or phrases pertaining to the information sought. In process 406, client program instructions 302 send the name of the data source and the keywords and phrases to server 118. As shown in process 408, 410, 412, and 414, server 118 queries one or more data sources 312 through 322, receives the results from the data source, formats the results, and returns the results to client program instructions 302.

Figure 5A:
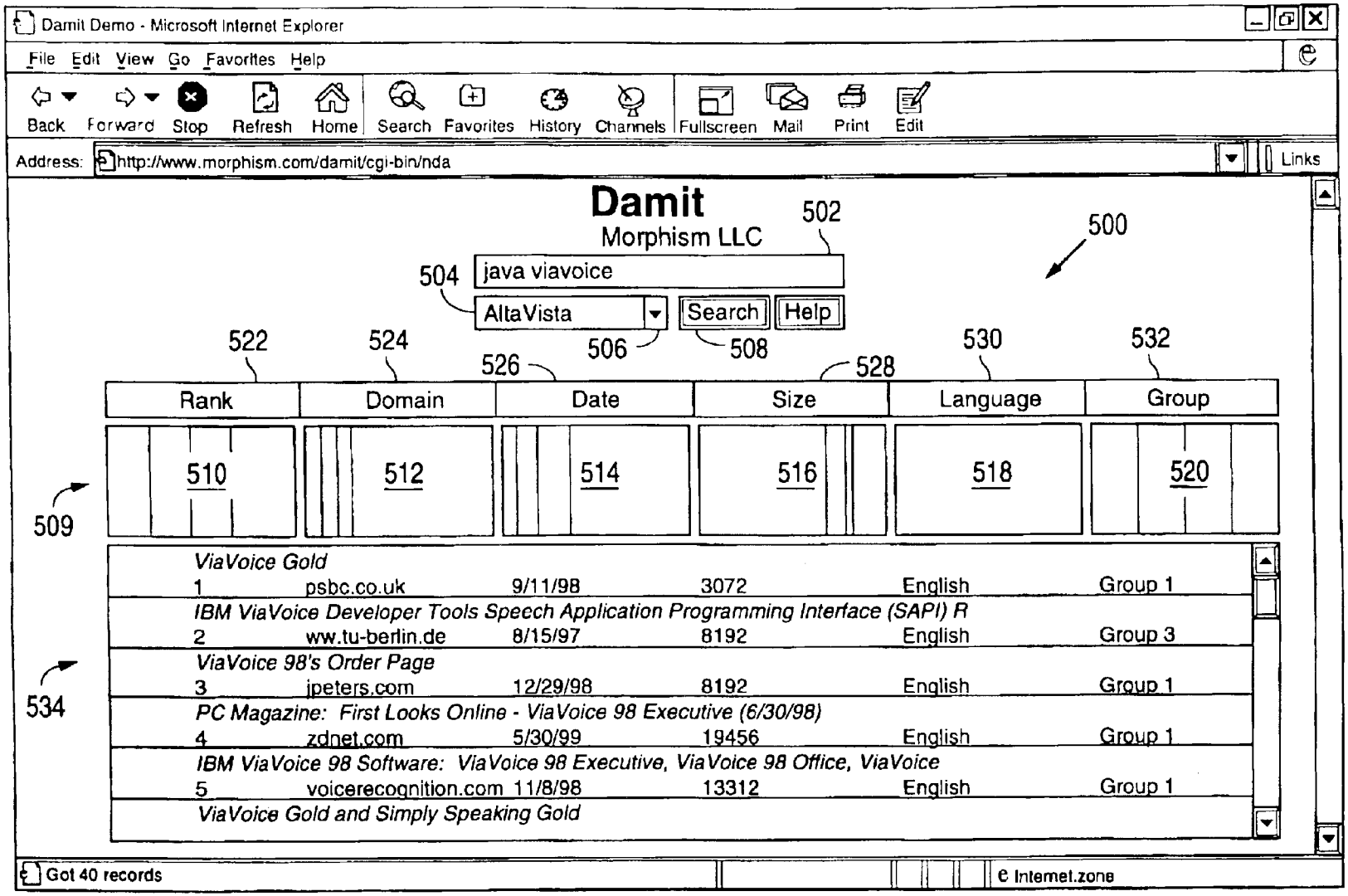
FIGS. 5a–5f are examples of a graphical user interface for viewing and navigating search results in accordance with the present invention.

The remaining portion of flowchart 400 pertains to another feature of the present invention namely, a graphical user interface (GUI) for selecting options and viewing the documents in different groups, or classes, according to selected display criteria. FIG. 5a shows an example of GUI 500 for viewing and navigating search results on a display monitor communicating with workstation 112 according to one embodiment of the present invention. To conduct a search, a user enters keywords and key phrases through an input device such as a keyboard or voice recognition system (as previously discussed in blocks 402 and 404 in flowchart 400). The input is received by an application program in workstation 112 which displays a copy of the input in query window 502. A variety of terms and logical and/or proximity operators may also be included, when supported by a particular search engine, to allow the user to include or exclude items in a set and to identify items having keywords that are a predetermined distance apart, such as within 10 words, in the same sentence, or that are adjacent. Additionally, queries may be entered in natural language which is parsed by logic in the search engine to determine key words and phrases for conducting a search.

A user then selects a source of information in data source window 504 by either typing in the name of the source directly or selecting an entry in a pull-down menu that is accessed by selecting arrow 506. To send the contents of query window 502 and data source window 504 to server 118, the user selects search button 508. Once server program instructions 304 compile and format the results of the search, they are sent to client program instructions 302. The results of the search include categories of information such as, for example, the size of each document, the rank of the documents as determined by the search engine, the date that each document was posted on the information network, the language each document is written in, the URL of each document, and the cluster in which each document is grouped as determined by the clustering algorithm utilized with the present invention, such as a K-means clustering algorithm. The type of information available is based on the categories of information available from data sources 312 through 322. For example, a data source for a sales catalog may include a number of different categories of information including, but not limited to, products, price, discount, product availability, sizes, colors, and other physical properties. Another example is a stock market data source that may include information including, but not limited to, number of shares outstanding, price per share, earnings per share, trading volume, and insider trading. The present invention is designed to be used with virtually any categories of information that are available from a data source. The information that is returned in response to a user's query is typically a list of data records for items such as, for example, documents, stocks, or products. For convenience of notation, the word "documents" is used herein to refer to the data records that are returned in response to the user's query.

Referring to process 416 in FIG. 4, client program instructions 302 analyze each category of information included in the search results and generate a first stratum of clusters for each category. Specifically, client program instructions 302 uses a clustering algorithm to create groups or clusters of documents having similar attributes for a particular category or number of categories of information. Clustering algorithms use various heuristics and parameters to determine the groups, depending on the algorithm. For example, the K-means algorithm uses parameters such as a search threshold, a maximum number of search rounds, and a maximum number of search iterations per round. Some examples of other parameters which are independent of the algorithm that may be taken into account to determine the groups include the maximum number of records in the table, the maximum number of blocks per column, and font sizes and color schemes. The clustering algorithm may be performed by either client program instructions 302 or server program instructions 304. For example, assume 200 or more documents were found during a search. The clustering algorithm determines each group based on one or more categories of information, such as a combination of "size and date", and "same author and price". The clustering algorithm also separates each group of documents into a set of sub-groups of documents having similar attributes.

Figure 5B:
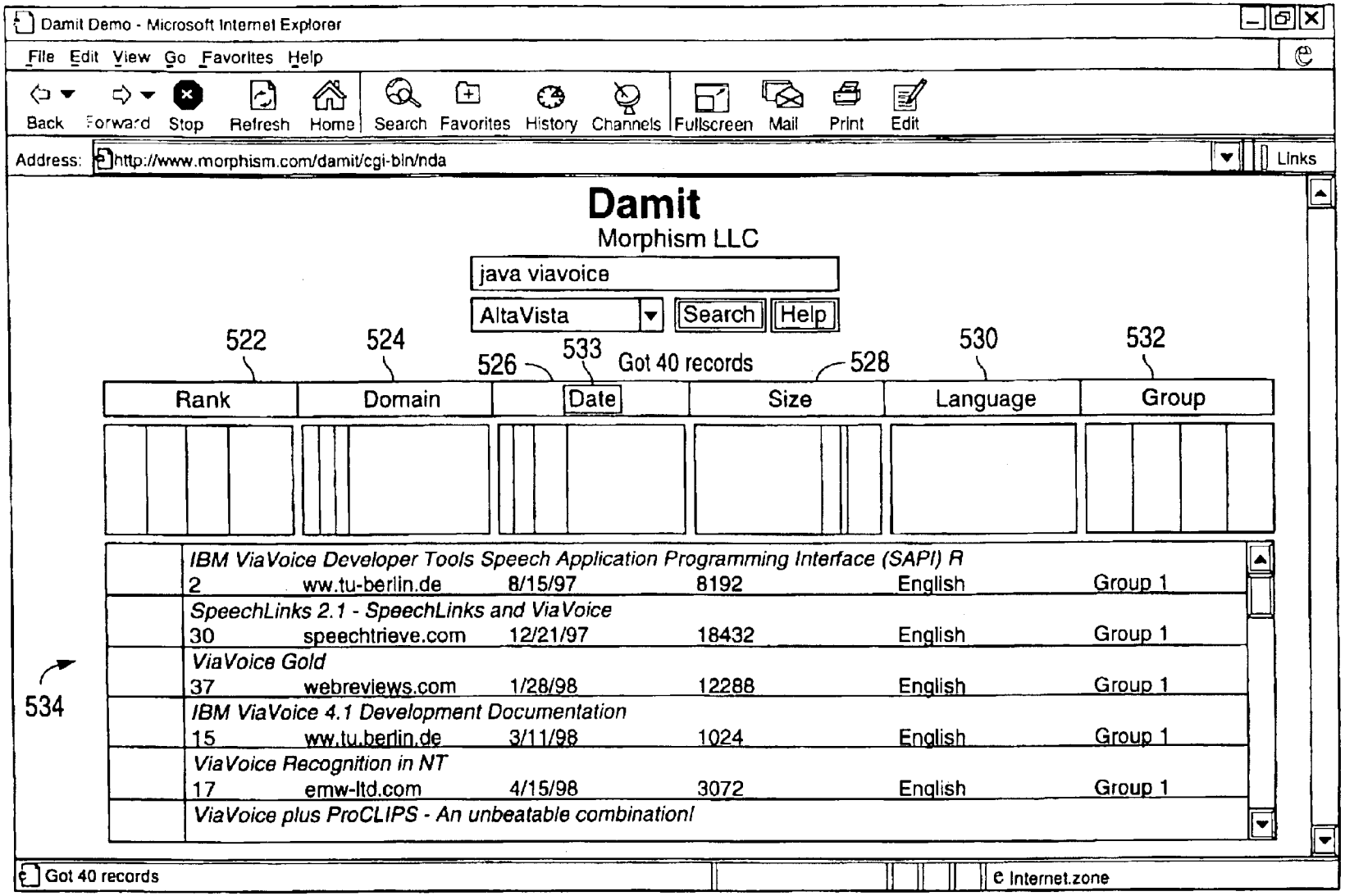
Figure 5C:
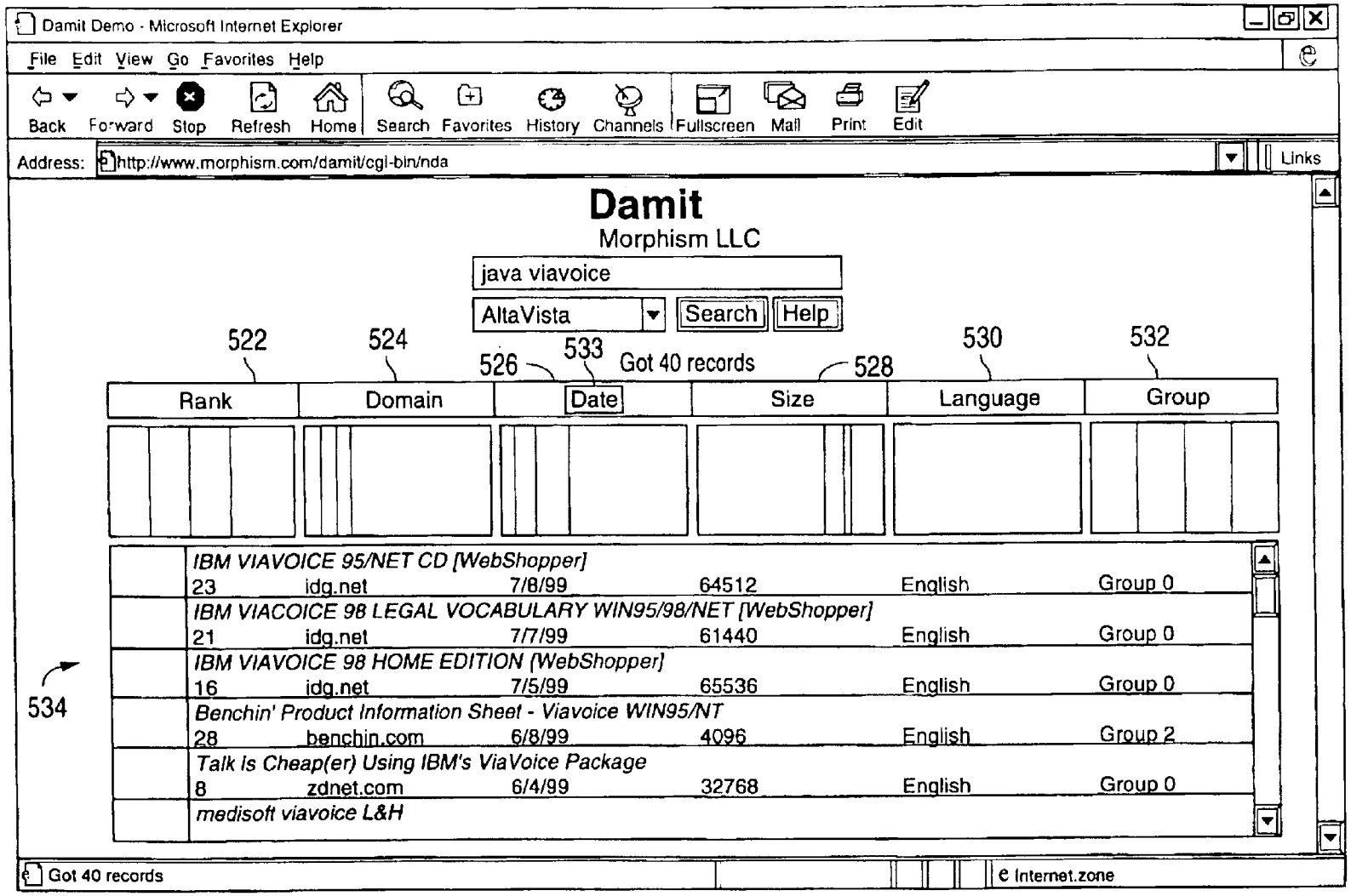

Subsequently, in process 418, the client program instructions 302 generate and display a graphical user interface to allow the user to view and navigate the various categories of information available. For example, GUI 500 in FIG. 5a shows first stratum 509 having columns representing the categories of rank 510, domain 512, date 514, size 516, language 518, and group 520. When a user selects a button heading a column, such as rank button 522, domain button 524, date button 526, size button 528, language button 530, or group button 532, the column is sorted by values. By toggling the button, the user switches the display of the list of documents in table 534 from descending to ascending order, or vice versa, for the selected category. An example of toggling the order documents are listed by date is shown in a comparison between FIGS. 5b and 5c, where the documents listed in FIG. 5b are shown in ascending order by date, and the documents listed in FIG. 5c are shown in descending order by date. An indicator, such as rim 535 shown in FIGS. 5b and 5c, is displayed in a contrasting color to indicate when one of buttons 522 through 532 is toggled.

Figure 5D:
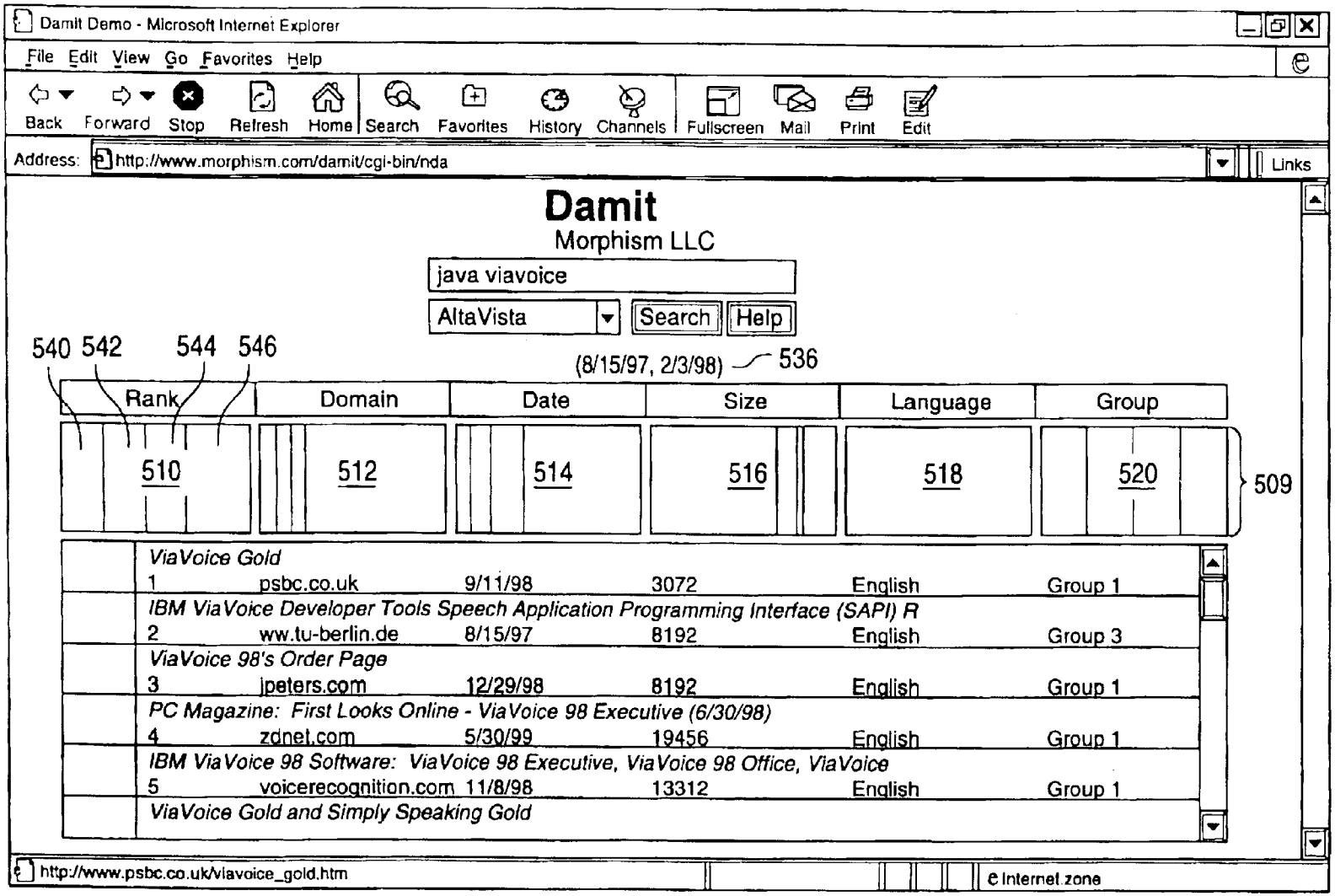

In another feature of the present invention, when the user moves a pointer, such as a mouse cursor or a light pen, over a block, a readout, for example the range of dates in window 536 as shown in FIG. 5d appears indicating the range of values represented by the block.

The sub-groups in each of columns 510 through 520 are indicated by a series of adjacent blocks, such as blocks 540 through 546 for rank column 510. When columns 510 through 520 are initially generated, only first stratum 509 is displayed. One embodiment of the present invention includes another feature in client program instructions 302 that generates a successive stratum when the user selects a block in a preceding stratum. For example, FIG. 5d shows second stratum 548 that is generated as a result of a user selecting block 550 in first stratum 509. Stratum 548 represents the distribution of values for the cluster of documents in selected block 550. Further, table 534 is updated to show only those documents that are included in block 550.

Figure 5E:
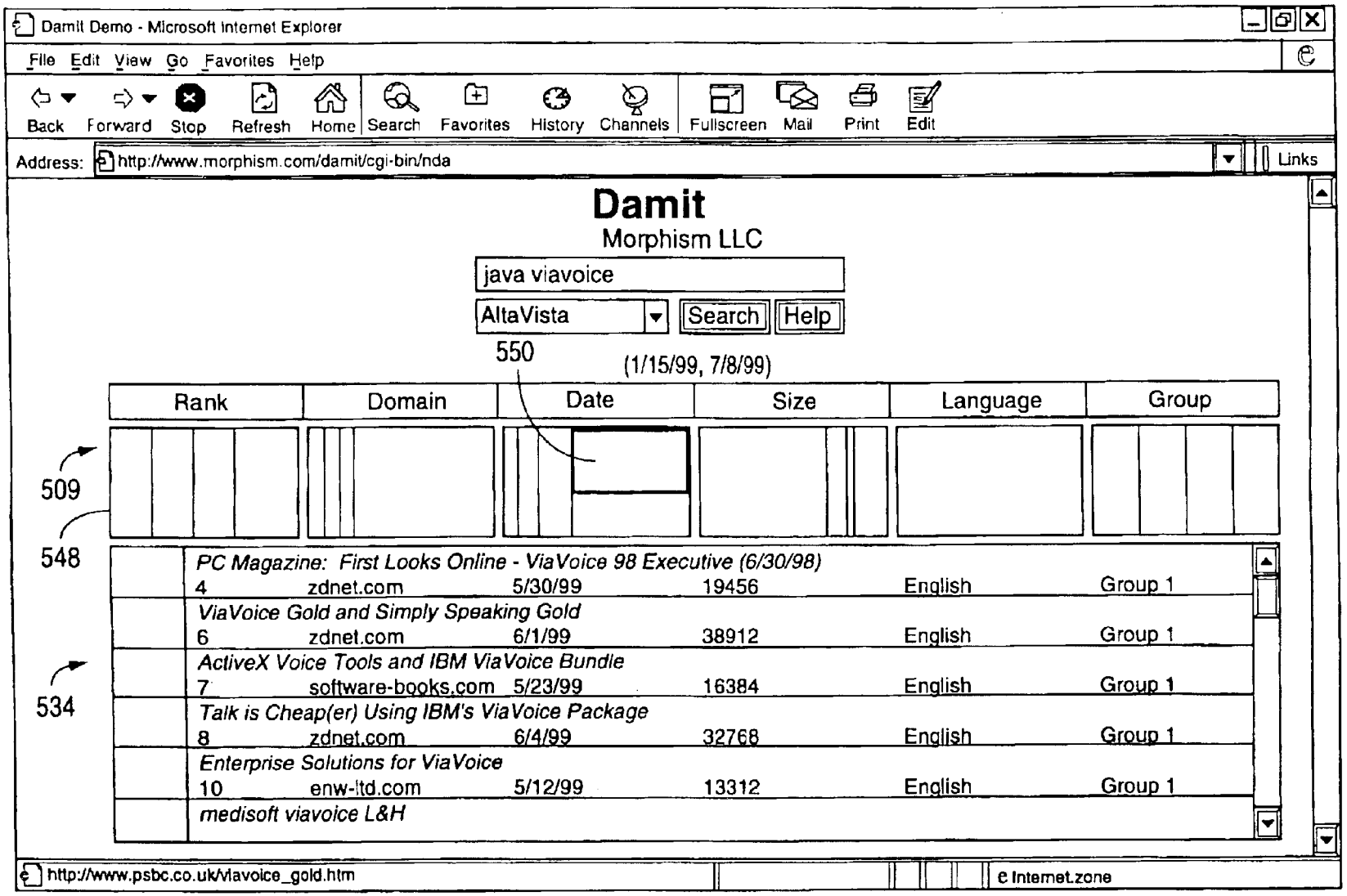
Figure 5F:
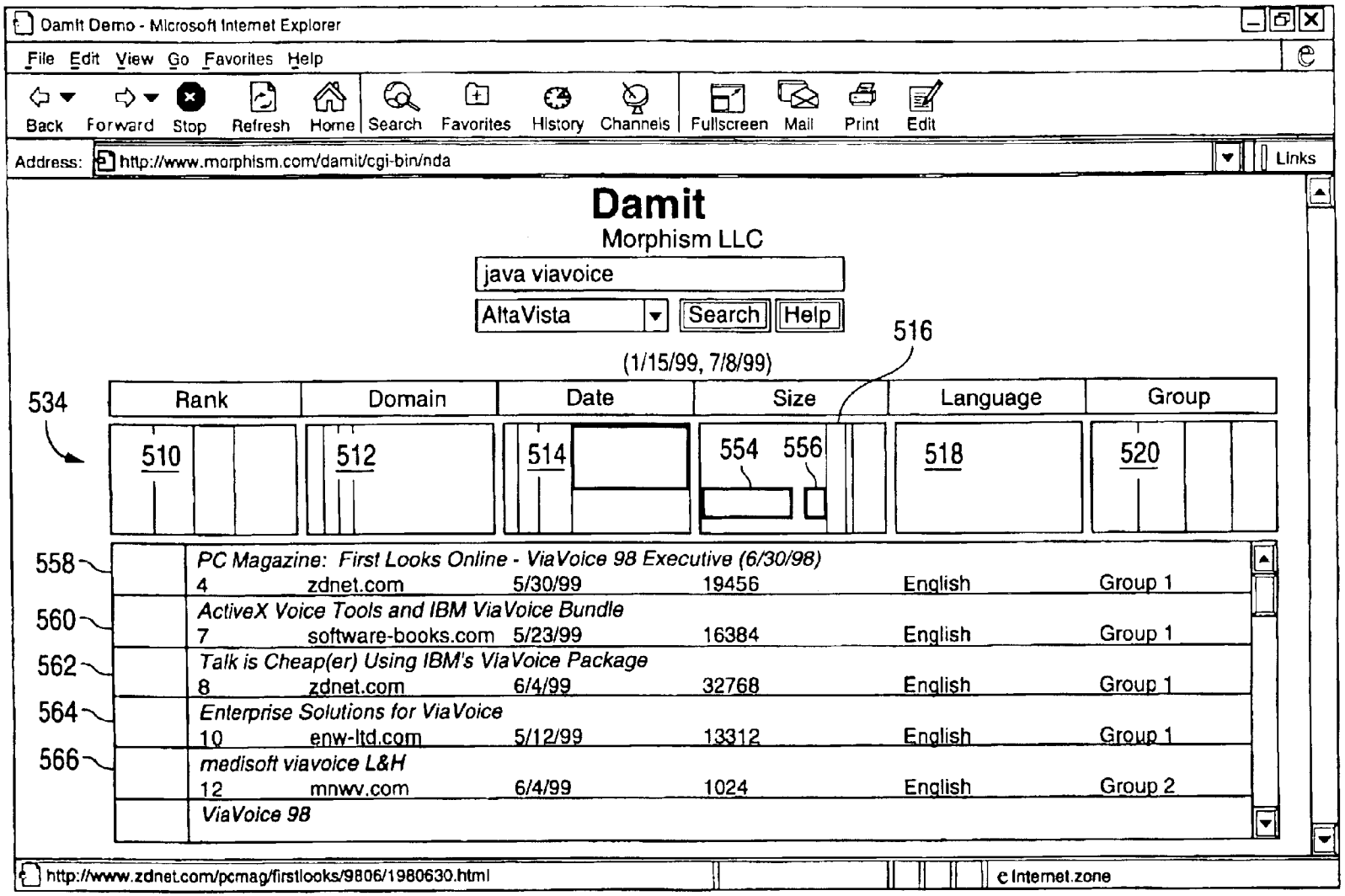

A user may also select more than one block in a stratum, as shown, for example, by blocks 554 and 556 in FIG. 5f. When blocks 554 and 556 are selected, third stratum 552, is generated, and table 534 is updated to include all the documents that belong in the clusters represented by blocks 554 and 556.

Another feature of table 534 is color-coded portions 558 through 566 that indicate which sub-group the list of documents displayed in table 534 correspond to for the selected category. Table 534 includes color-coded portions 558 through 566 that correspond to the color-coding of the blocks in columns 510 through 520. This allows the user to readily see which sub-group of the selected category the documents being shown in table 534 belong to.

The width of the blocks in each stratum represents the relative number of records in the cluster represented by a block. Thus, the wider a block is, the more records it includes. Additionally the height of a block indicates the relative number of records contained in that block's stratum. These height and width indicators provide another visual cue of the distribution of the documents according to the various categories for which information is available, and allows the user to visually determine which cluster is likely to contain relevant information. For example, a user may find that only documents from a selected time frame would be relevant. In this situation, the user could select the block containing documents that are near the desired date, with the result that only those documents would be shown in table 534. This feature allows the user to navigate through a reduced number of documents to find those that are most relevant, thereby saving time. Notably, the user may select one or more blocks from one or more different columns to generate a list of documents in table 534 that meet criteria in two or more categories, for example, size and date.

To further facilitate navigation, the URL for a document listed in table 534 may be accessed in another browser frame when the listing is selected with a selection device, such as clicking a mouse cursor or light pen over the document listing.

Another feature that may be implemented in an embodiment of the present invention is group column 520. The clustering algorithm automatically groups similar records of the documents found in the search together. Group column 520 allows the user to select a cluster and examine the blocks in the new stratum. The widths of the blocks in the new stratum will allow the user to evaluate the breakdown of the groups and why records are assigned to a given group.

Referring back to flow diagram 400 in FIG. 4, processes 420 through 434 outline the functionality of GUI 500 as the user interacts with the present invention. In processes 422 through 426, when one or more blocks, such as block 550 in FIG. 5e, is selected, a new stratum that is displayed below the selected block's stratum is generated. Table 534 is then updated to display the list of documents selected according to the criteria corresponding to the blocks selected. Table 534 is also updated when a block corresponding to another group is selected. When all the blocks are deselected from a stratum, the stratum below it is removed from the display.

Processes 428 through 430 show that the URL for a document is accessed and the corresponding web page is displayed in another browser frame when a document is selected from the list of documents in table 534.

When a column button, such as one of column buttons 522 through 532, is selected, processes 432 and 434 show that the list of documents in table 534 is resorted in ascending or descending order with respect to the criteria corresponding to the column selected.

While the invention has been described with respect to the embodiments and variations set forth above, these embodiments and variations are illustrative and the invention is not to be considered limited in scope to these embodiments and variations. For example, the present invention may be used to deliver personalized advertising to the client. Preferences for advertising content may be specified by the user, or the client program instructions 302 or server program instructions 304 could choose advertisements based on the topic(s) being searched by the user. Accordingly, various other embodiments and modifications and improvements not described herein may be within the spirit and scope of the present invention, as defined by the following claims.

What is claimed is:

1. A computer program product for representing and navigating search results on a client computer system, wherein the search results are transmitted to the client computer system from a data source, the computer program product comprising:

a set of client program instructions including:

first program instructions being operable to receive user input, the user input including a data source to search for information and a query indicating information which is desired from the data source;

second program instructions being operable to transmit the user input to the data source and to receive information responsive to the query from the data source, wherein the responsive information includes multidimensional characteristic information about the responsive information;

third program instructions being operable to separate the responsive information into a plurality of groups based on one or more categories of said multidimensional characteristic information;

third program instructions, being further operable to separate the responsive information into a plurality of subgroups based on selected multidimensional characteristic information; and fourth program instructions being operable to allow the user to select at least one group of the responsive information.

2. The computer program product, as set forth in claim 1, further comprising:

fifth program instructions for generating a graphical user interface, the graphical user interface including a first display portion showing the plurality of groups of multidimensional characteristic information available for the user to select.

3. The computer program product, as set forth in claim 2, wherein the responsive information includes a list of documents containing information related to the query, and wherein the graphical user interface further includes a second display portion showing the list of documents in the responsive information.

4. The computer program product, as set forth in claim 3, wherein the documents displayed belong to the at least one group selected by the user.

5. The computer program product, as set forth in claim 3, wherein the fifth program instructions are [faker] operable to receive user input indicating a document in the list of documents, the fifth program instructions being further operable to initiate a display of the indicated document.

6. The computer program product, as set forth in claim 3, wherein the fifth program instructions are [fixer] operable to receive user input indicating a group of the documents, the fifth program instructions being further operable to re-arrange the order in which the list of documents in the second display portion are displayed based on the group selected by the user.

7. The computer program product, as set forth in claim 2, wherein the first display portion further shows a graphical representation of the plurality of subgroups.

8. The computer program product, as set forth in claim 2, wherein the first display portion further shows the plurality of subgroups, the first display portion including color coded portions for differentiating the subgroups.

9. The computer program product, as set forth in claim 8, wherein the graphical user interface further includes a second display portion showing a list of documents in the responsive information, the second display portion including color coded portions associated with the list of documents corresponding to the color coded portions in the first display portion.

10. The computer program product, as set forth in claim 2, further comprising program instructions for displaying additional information based on the at least one group of the responsive information selected by the user.

11. The computer program product, as set forth in claim 1, wherein the third program instructions separate the responsive information into a plurality of subgroups based on one or more ranges of the selected multidimensional characteristic information.

12. The computer program product, as set forth in claim 11, wherein the first display portion includes a stratum showing the subgroups of the responsive information, the fifth program instructions being further operable to[:]*:* receive user input comprising selection of at least one subgroup; and display additional information based on at least one subgroup selected by the user, wherein the additional information displayed includes another stratum showing a further subgroup of the responsive information.

13. The computer program product, as set forth in claim 12, wherein the graphical user interface further includes a second display portion showing at least a portion of the responsive information, the fifth program instructions being further operable to update the responsive information in the second display portion based on the at least one subgroup selected by the user.

14. The computer program product, as set forth in claim 1, further comprising:

server program instructions operable to transmit data between the client computer system and the data source.

15. The computer program product, as set forth in claim 14, wherein the data includes the user input.

16. The computer program product, as set forth in claim 14, wherein the data includes the responsive information.

17. The computer program product, as set forth in claim 14, wherein the server program instructions include the third program instructions.

18. A method for representing and navigating search results on a client computer system, the method comprising:

receiving user input in the client computer system, the user input including a data source to search for information and a query indicating information which is desired [form] *from* the data source;

transmit the user input from the client computer system to the data source;

searching the data source for information responsive to the query[,]*;* receiving information responsive to the query from the data source, wherein the responsive information includes, multidimensional characteristic information about the [documents] *responsive information*;

separating the responsive information into a plurality of groups based on one or more categories of said multidimensional characteristic information[,]*;* further separating the responsive information into a plurality of subgroups based on selected multidimensional characteristic information; and providing means to allow the user to select at least one group of the responsive information.

19. The method, as set forth in claim 18, further comprising:

generating a graphical user interface including generating a first display portion showing the plurality of groups of multidimensional characteristic information available for the user to select.

20. The method, as set forth in claim 19, wherein the responsive information includes a list of documents containing information related to the query, and wherein the graphical user interface further includes a second display portion showing the list of documents in the responsive information.

21. The method, as set forth in claim 20, wherein the documents displayed belong to the at least one group selected by the user.

22. The method, as set forth in claim 20, further comprising receiving user input indicating a document in the list of documents, and displaying the indicated document.

23. The method, as set forth in claim 20, further comprising receiving user input indicating a group of the documents, and re-arranging the order in which the list of documents in the second display portion are displayed based on the group selected by the user.

24. The method, as set forth in claim 19, wherein the first display portion further shows a graphical representation of the plurality of subgroups.

25. The method, as set forth in claim 19, further comprising displaying the plurality of subgroups in the first display portion, and color coding the display of the plurality of the subgroups in the first display portion for differentiating the subgroups.

26. The method, as set forth in claim 25, wherein generating the graphical user interface further includes generating a second display portion showing a list of documents in the responsive information, the second display portion including color coded portions associated with the list of documents corresponding to the color coded portions in the first display portion.

27. The method, as set forth in claim 19, further comprising displaying additional information based on the at least one group of the responsive information selected by the user.

28. The method, as set forth in claim 18, wherein said responsive information is separated into said plurality of subgroups based on one or more ranges of the selected multidimensional characteristic information.

29. The method, as set forth in claim 28, wherein the first display portion includes a stratum showing the subgroups of the responsive information, the method further comprising:

receiving user input comprising selection of at least one subgroup; and displaying additional information based on at least one subgroup selected by the user, wherein the additional information displayed includes another stratum showing a further subgroup of the responsive information.

30. The method, as set forth in claim 29, wherein the graphical user interface further includes a second display portion showing at least a portion of the responsive information, the method further including updating the responsive information in the second display portion based on the at least one subgroup selected by the user.

31. A system for representing and navigating search results, the system comprising:

at least one data source;

a client computer system;

a set of client program instructions executable on the client computer system, the client program instructions including:

first program instructions being operable to receive user input, the user input including a query indicating information which is desired from the at least one data source, second program instructions being operable to transmit the user input to the at least one data source and to receive information responsive to the query from the at least one data source, wherein the responsive information includes multidimensional characteristic information about the responsive information;

third program instructions being operable to separate the responsive information into a plurality of groups based on one or more categories of said multidimensional characteristic information;

third program instructions being further operable to separate the responsive information into a plurality of subgroups based on selected multidimensional characteristic information; and fourth program instructions being operable to allow the user to select at least one group of the responsive information.

32. The system, as set forth in claim 31, further comprising:

fifth program instructions for generating a graphical user interface, the graphical user interface including a first display portion showing the plurality of groups of multidimensional characteristic information available for the user to select.

33. The system, as set forth in claim 32, wherein the responsive information includes a list of documents containing information related to the query, and wherein [The] *the* graphical user interface further includes a second display portion showing the list of documents in the responsive information.

34. The system, as set forth in claim 33, wherein the documents displayed belong to the at least one group selected by the user.

35. The system, as set forth in claim 33, wherein the fifth program instructions are further operable to receive user input indicating a document in the list of documents, the fifth program instructions being further operable to initiate a display of the indicated document.

36. The system, as set forth in claim 33, wherein [The] *the* fifth program instructions are further operable to receive user input indicating a group of the documents, the fifth program instructions being further operable to rearrange the order in which the list of documents in the second display portion are displayed based on the group selected by the user.

37. The system, as set forth in claim 32, wherein the first display portion further shows a graphical representation of the plurality of subgroups.

38. The system, as set forth in claim 32, wherein the first display portion further shows the plurality of subgroups, the first display portion including color coded portions for differentiating the subgroups.

39. The system, as set forth in claim 38, wherein the graphical user interface further includes a second display portion showing a list of documents in the responsive information, the second display portion including color coded portions associated with the list of documents corresponding to the color coded portions in the first display portion.

40. The system, as set forth in claim 32, further comprising program instructions for displaying additional information based on the at least one group of the responsive information selected by the user.

41. The system, as set forth in claim [n] 31, wherein the third program instructions separate the responsive information into a plurality of subgroups based on one or more ranges of the selected multidimensional characteristic information.

42. The system, as set forth in claim 41, wherein the first display portion includes a stratum showing the subgroups of the responsive information, the fifth program instructions being further operable to:

receive user input comprising selection of at least one subgroup, and display additional information based on at least one subgroup selected by the user, wherein the additional information displayed includes another stratum showing a further subgroup of the responsive information.

43. The system, as set forth in claim 42, wherein the graphical user interface further includes a second display portion showing at least a portion of the responsive information, the fifth program instructions being further operable to update the responsive information in the second display portion based on the at least one subgroup selected by the user.

44. The system, as set forth in claim 31, further comprising:

at least one server computer system including server program instructions operable to [Transmit] *transmit* data between the client computer system and the data source.

45. The system, as set forth in claim 44, wherein the data includes the user input.

46. The system, as set forth in claim 44, wherein the data includes the responsive information.

47. The system, as set forth in claim *44,* wherein the server program instructions include the third program instructions.

*48. A method, comprising:*

*receiving a query indicating a request for information from at least one data source;*

*sending information to a server to initiate a search operation of the at least one data source based at least in part on the query;*

*receiving information responsive to the query based on the search operation;*

*separating the responsive information into one or more groups based at least in part on multidimensional characteristic information associated with the responsive information;*

*receiving a selection of one or more of the groups; and*

*in response to receiving the selection, separating the responsive information into one or more subgroups based at least in part on the multidimensional characteristic information.*

*49. A method as claimed in claim 48, further comprising:*

*displaying a graphical representation of at least a portion of the multidimensional characteristic information of the one or more groups.*

*50. A method as claimed in claim 48, wherein the responsive information includes a list of documents containing information related to the query, the method further comprising:*

*displaying a graphical representation of at least a portion of the list of documents.*

*51. A method as claimed in claim 48, wherein the responsive information includes a list of documents containing information related to the query, the method further comprising:*

*displaying a graphical representation of at least a portion of the list of documents that belong to at least one selected group of documents.*

*52. A method as claimed in claim 48, wherein the responsive information includes a list of documents containing information related to the query, the method further comprising:*

*displaying a graphical representation of at least a portion of the list of documents, and displaying at least one document selected from the list of documents.*

*53. A method as claimed in claim 48, wherein the responsive information includes a list of documents containing information related to the query, the method further comprising:*

*displaying a graphical representation of at least a portion of the list of documents, and*

*arranging an order in which the list of documents is displayed based on a selected group of documents.*

*54. A method as claimed in claim 48, further comprising:*

*displaying a graphical representation of the at least one or more subgroups.*

*55. A method as claimed in claim 48, further comprising:*

*displaying a graphical representation of the at least one or more subgroups, and*

*color coding the display of the at least one or more subgroups for differentiating the subgroups.*

*56. A method as claimed in claim 48, further comprising:*

*displaying a graphical representation of the at least one or more subgroups;*

*color coding the graphical representation of the at least one or more subgroups for differentiating the subgroups; and*

*displaying a list of documents of the responsive information having color coded portions corresponding to the color coding of the graphical representation of the at least one or more subgroups.*

*57. A method as claimed in claim 48, further comprising:*

*displaying additional information based at least in part on the at least one group of the responsive information of the selection of at least one or more of the groups.*

*58. A method as claimed in claim 48, further comprising:*

*separating the responsive information into a plurality of subgroups based at least in part on a plurality of ranges of the multidimensional characteristic information.*

*59. A method as claimed in claim 48, further comprising:*

*displaying a stratum showing the subgroups of the responsive information;*

*receiving a selection of at least one subgroup;*

*displaying additional information based on the selection; and*

*displaying a further stratum showing a further subgroup of the responsive information.*

*60. A method as claimed in claim 48, further comprising:*

*displaying at least a portion of the responsive information; and*

*updating said displaying based at least in part on the selection.*

*61. A method as claimed in claim 48, further comprising:*

*receiving a plurality of queries requesting information from the at least one data source;*

*sending information to the server to initiate search operations based at least in part on the queries; and*

*receiving personalized advertisement from the server based on information associated with the queries.*

*62. A computer-implemented method as claimed in claim 48,*

*wherein said separating the responsive information into one or more groups comprises clustering the responsive information into one or more groups, wherein said clustering comprises separating the responsive information into mutually exclusive groups.*

*63. A computer readable storage medium comprising program instructions, wherein the program instructions are executable to:*

*receive a query indicating a request for information from at least one data source;*

*initiate a search operation for information from the at least one data source responsive at least in part to the query;*

*receive information based on the search operation, the information including responsive information and multidimensional characteristic information associated with the responsive information;*

*separate the responsive information into one or more groups based at least in part on the multidimensional characteristic information;*

*receive a selection of one or more of the groups based at least in part on the multidimensional characteristic information; and*

*in response to receiving the selection, separate the responsive information into one or more subgroups based at least in part on the multidimensional characteristic information associated with the selected one or more groups.*

*64. The computer readable storage medium as claimed in claim 63, further comprising program instructions that are executable to:*

*display a graphical representation of at least a portion of the multidimensional characteristic information of the one or more groups.*

*65. The computer readable storage medium as claimed in claim 63, wherein the responsive information includes a list of documents containing information related to the query, wherein the computer readable storage medium further comprising program instructions that are executable to:*

*display a graphical representation of at least a portion of the list of documents.*

*66. The computer readable storage medium as claimed in claim 63, wherein the responsive information includes a list of documents containing information related to the query, wherein the computer readable storage medium further comprising program instructions that are executable to:*

*display a graphical representation of at least a portion of the list of documents that belong to at least one selected group of documents.*

*67. The computer readable storage medium as claimed in claim 63, wherein the responsive information includes a list of documents containing information related to the query, wherein the computer readable storage medium further comprising program instructions that are executable to:*

*display a graphical representation of at least a portion of the list of documents, and displaying at least one document selected from the list of documents.*

*68. The computer readable storage medium as claimed in claim 63, wherein the responsive information includes a list of documents containing information related to the query, wherein the computer readable storage medium further comprising program instructions that are executable to:*

*display a graphical representation of at least a portion of the list of documents; and*

*arrange an order in which the list of documents is displayed based at least in part on a selected group of documents.*

*69. The computer readable storage medium as claimed in claim 63, wherein the computer readable storage medium further comprising program instructions that are executable to:*

*display a graphical representation of the at least one or more subgroups.*

*70. The computer readable storage medium as claimed in claim 63, wherein the computer readable storage medium further comprising program instructions that are executable to:*

*display a graphical representation of the at least one or more subgroups, and*

*color code the display of the at least one or more subgroups for differentiating the subgroups.*

*71. The computer readable storage medium as claimed in claim 63, wherein the computer readable storage medium further comprising program instructions that are executable to:*

*display a graphical representation of the at least one or more subgroups, and*

*color code the graphical representation of the at least one or more subgroups for differentiating the subgroups, and display a list of documents of the responsive information having color coded portions corresponding to the color coding of the graphical representation of the at least one or more subgroups.*

*72. The computer readable storage medium as claimed in claim 63, wherein the computer readable storage medium further comprising program instructions that are executable to:*

*display additional information based at least in part on the at least one group of the responsive information of the selection of at least one or more of the groups.*

*73. The computer readable storage medium as claimed in claim 63, wherein the computer readable storage medium further comprising program instructions that are executable to:*

*separate the responsive information into at least one or more subgroups based at least in part on one or more ranges of selected multidimensional characteristic information.*

*74. The computer readable storage medium as claimed in claim 63, wherein the computer readable storage medium further comprising program instructions that are executable to:*

*display a stratum showing the subgroups of the responsive information;*

*receive a selection of at least one subgroup;*

*display additional information based at least in part on the selection; and*

*display a further stratum showing a further subgroup of the responsive information.*

*75. The computer readable storage medium as claimed in claim 63, wherein the computer readable storage medium further comprising program instructions that are executable to:*

*display at least a portion of the responsive information; and*

*update said displaying based at least in part on the selection.*

*76. A computer readable storage medium as claimed in claim 63, wherein in separating the responsive information into one or more groups, the program instructions are executable to cluster the responsive information into one or more groups, wherein said clustering comprises separating the responsive information into mutually exclusive groups.*

*77. A computer system, comprising:*

*a processor; and*

*a memory coupled to the processor, wherein the memory comprises program instructions that are executable by the processor to:*

*receive a query indicating a request for information from at least one data source;*

*send information to a server to initiate a search operation of the at least one data source based at least in part on the query;*

*receive information responsive to the query based on the search operation;*

*separate the responsive information into one or more groups based at least in part on multidimensional characteristic information associated with the responsive information;*

*receive a selection of one or more of the groups; and*

*in response to receiving the selection, separate the responsive information into one or more subgroups based at least in part on the multidimensional characteristic information.*

*78. A computer system as claimed in claim 77, wherein in separating the responsive information into one or more groups, the program instructions are executable to cluster the responsive information into one or more groups, wherein said clustering comprises separating the responsive information into mutually exclusive groups.*

*79. A computer-implemented method, comprising:*

*receiving a query indicating a request for information from at least one data source;*

*sending information to a server to initiate a search operation of the at least one data source based at least in part to the query;*

*receiving information responsive to the query based on the search operation;*

*separating the responsive information into one or more groups and subgroups based at least in part on a plu-*

*rality of categories and subcategories of the multidimensional characteristic information;*

*displaying a graphical representation of the categories of multidimensional characteristic information associated with the one or more groups in a first display portion;*

*in response to receiving a selection of one or more of the categories;*

*displaying a graphical representation of at least a subset of the responsive information in a second display portion sorted based on the selected one or more categories; and*

*displaying a graphical representation of the subcategories of multidimensional characteristic information associated with the one or more subgroups in the first display portion.*

*80. A method as claimed in claim 79, further comprising, in response to receiving a selection of one or more of the subcategories, displaying a graphical representation of at least a subset of the responsive information in a second display portion sorted based on the selected one or more subcategories.*

*81. A computer system, comprising:*

*a processor; and*

*a memory coupled to the processor, wherein the memory comprises program instructions that are executable by the processor to:*

*receive a query indicating a request for information from at least one data source;*

*send information to a server to initiate a search operation of the at least one data source based at least in part to the query;*

*receive information responsive to the query based on the search operation;*

*separate the responsive information into one or more groups and subgroups based at least in part on a plurality of categories and subcategories of the multidimensional characteristic information;*

*display a graphical representation of the categories of multidimensional characteristic information associated with the one or more groups in a first display portion;*

*in response to receiving a selection of one or more of the categories;*

*display a graphical representation of at least a subset of the responsive information in a second display portion sorted based on the selected one or more categories; and*

*display a graphical representation of the subcategories of multidimensional characteristic information associated with the one or more subgroups in the first display portion.*

*82. A computer system as claimed in claim 81, wherein the memory further comprising program instructions that are executable by the processor to:*

*in response to receiving a selection of one or more of the subcategories, display a graphical representation of at least a subset of the responsive information in a second display portion sorted based on the selected one or more subcategories.*

*83. A computer readable storage medium comprising program instructions, wherein the program instructions are executable to:*

*receive a query indicating a request for information from at least one data source;*

*send information to a server to initiate a search operation of the at least one data source based at least in part to the query;*

*receive information responsive to the query based on the search operation;*

*separate the responsive information into one or more groups and subgroups based at least in part on a plurality of categories and subcategories of the multidimensional characteristic information;*

*display a graphical representation of the categories of multidimensional characteristic information associated with the one or more groups in a first display portion;*

*in response to receiving a selection of one or more of the categories;*

*display a graphical representation of at least a subset of the responsive information in a second display portion sorted based on the selected one or more categories; and*

*display a graphical representation of the subcategories of multidimensional characteristic information associated with the one or more subgroups in the first display portion.*

*84. The computer readable storage medium as claimed in claim 83, further comprising program instructions that are executable to:*

*in response to receiving a selection of one or more of the subcategories, display a graphical representation of at least a subset of the responsive information in a second display portion sorted based on the selected one or more subcategories.*

*85. A computer readable storage medium comprising program instructions, wherein the program instructions are executable to:*

*receive a query indicating a request for information from at least one data source;*

*send information to a server to initiate a search operation of the at least one data source based at least in part on the query;*

*receive information responsive to the query based on the search operation;*

*separate the responsive information into one or more groups based at least in part on multidimensional characteristic information associated with the responsive information;*

*receive a selection of one or more of the groups; and*

*in response to the selection, separate the responsive information into one or more subgroups based at least in part on the multidimensional characteristic information.*

* * * * *

UNITED STATES PATENT AND TRADEMARK OFFICE

CERTIFICATE OF CORRECTION

PATENT NO. : RE42,262 E
APPLICATION NO. : 11/256615
DATED : March 29, 2011
INVENTOR(S) : Stephens, Jr.

It is certified that error appears in the above-identified patent and that said Letters Patent is hereby corrected as shown below:

On the Title page, item (75), under "Inventor", Line 1, delete "James J. Stephens, Jr.," and insert -- James H. Stephens, Jr., --.

On the Title page, item (56), under "Other Publications", Line 6, delete "Enginge" and insert -- Engine --.

On Title page 2, item (56), under "Other Publications", Line 2, delete "AMC" and insert -- ACM --.

Column 12, line 14, in Claim 18, delete "includes," and insert -- includes --.

Column 19, line 8, in Claim 79, delete "*categories;*" and insert -- *categories:* --.

Column 19, line 45, in Claim 81, delete "*categories;*" and insert -- *categories:* --.

Column 20, line 22, in Claim 83, delete "*categories;*" and insert -- *categories:* --.

Signed and Sealed this
Ninth Day of August, 2011

David J. Kappos

David J. Kappos
*Director of the United States Patent and Trademark Office*